United States Patent [19]
Sato et al.

[11] Patent Number: 5,430,293
[45] Date of Patent: Jul. 4, 1995

[54] GAS VISUALIZING APPARATUS AND METHOD FOR DETECTING GAS LEAKAGE FROM TANKS OR PIPING

[75] Inventors: Tominori Sato; Toshihide Kanagawa; Koichi Sumida; Takeshi Nishio, all of Osaka, Japan

[73] Assignee: Osaka Gas Co., Ltd., Osaka, Japan

[21] Appl. No.: 228,146

[22] Filed: Apr. 15, 1994

Related U.S. Application Data

[63] Continuation-in-part of Ser. No. 951,722, Sep. 25, 1992, abandoned.

[30] Foreign Application Priority Data

Oct. 8, 1991 [JP] Japan .................................. 3-260113
Oct. 8, 1991 [JP] Japan .................................. 3-260114

[51] Int. Cl.⁶ .......................................... G01N 21/35
[52] U.S. Cl. .............................. 250/330; 250/338.5
[58] Field of Search ................... 250/338.5, 330, 332, 250/339.13, 340, 341; 356/437

[56] References Cited

U.S. PATENT DOCUMENTS

| | | | |
|---|---|---|---|
| 4,555,627 | 11/1985 | McRae, Jr. | 250/330 X |
| 4,772,789 | 9/1988 | Maram et al. | 250/330 |
| 4,947,044 | 8/1990 | Pinson | 250/330 |
| 4,999,614 | 3/1991 | Ueda et al. | 250/330 X |
| 5,001,346 | 3/1991 | Barkhoudarian | 250/330 |
| 5,306,913 | 4/1994 | Noack et al. | 250/330 X |

FOREIGN PATENT DOCUMENTS

4-93745  3/1992  Japan .................................. 250/338.5

*Primary Examiner*—Constantine Hannaher
*Assistant Examiner*—Edward J. Glick
*Attorney, Agent, or Firm*—Gifford, Krass, Groh, Sprinkle, Patmore, Anderson & Citkowski

[57] ABSTRACT

A gas visualizing apparatus includes an image sensor for detecting infrared light radiated or reflected from a background of a gas leak monitoring territory A, a laser source for emitting a detection infrared beam in two-dimensional form toward the gas leak monitoring territory A, the detection infrared beam having a wavelength absorbable by a gas "g" to be detected and a CRT for displaying information relating to gas leakage as a two-dimensional visible image corresponding to the gas leak monitoring territory A. The laser source includes a beam expander for converging or diverging the detection infrared beam to vary an area of the gas leak monitoring territory A. The image sensor includes a transmission and width varying device for setting the infrared light entering the image sensor to a band substantially centering on the wavelength of the detection infrared beam, and varying a width of the band, to realize an excellent visible image.

9 Claims, 6 Drawing Sheets

GAS VISUALIZING APPARATUS AND METHOD FOR DETECTING GAS LEAKAGE FROM TANKS OR PIPING

This is a continuation-in-part of U.S. Ser. No. 07/951,722 filed Sep. 25, 1992, now abandoned.

BACKGROUND OF THE INVENTION

1. Field of the Invention

This invention relates to a gas visualizing apparatus and a gas visualizing method, and more particularly to a gas visualizing apparatus and method for detecting gas leakage from tanks or piping in industrial plants from piping buried under or exposed from roads or the like, or outdoor or indoor piping for dwelling houses.

Such a gas visualizing apparatus and method may also be used for detecting gas leakage occurring during gas tightness tests

2. Description of the Prior Art

Conventionally, in detecting gas leakage in industrial plants, gas leak conditions are grasped through a plurality of detectors arrange in a monitoring territory. According to this method, detection is limited to an installment position of the detecting device. In order to determine leak point for large areas in an industrial plant (i.e. an amount of gas leakage and a position of a specific leaking point in a tank or piping), for example, it is necessary to install gas leak detectors in numerous locations to grasp leak conditions.

On the other hand, proposal have been made, for monitoring such gas leakage, to emit an infrared beam to a particular gas leak monitoring territory, and determine gas leakage by referring to the state in which the infrared beam is absorbed by the leaking gas. In this case, however, since the beam used is collimated, it is necessary to cause the beam to scan the monitoring territory.

The Inventors have devised a gas visualizing apparatus in which an infrared beam is emitted in a two-dimensional manner by a light emitter to cover a relatively large gas leak monitoring territory. However, such an apparatus involves great power consumption to drive the light emitter. This apparatus has a further disadvantage of requiring a large and expensive high-power laser.

It is sufficient just to detect infrared radiation from a background in a gas leak monitoring territory, and visualize gas leak conditions in the form, for example, of a variable density image on a display unit such as a CRT. However, with an apparatus have an ordinary construction, a detection signal providing gas absorption information is weak relative to a background signal, resulting in an inadequate display made on the CRT. That is, depending on the weather or season, the image may be too bright or too dark under the influence of sunlight and the like. This, a good resolution of light and shade cannot be achieved to reflect a gas concentration to be detected. However since the infrared gas absorption information of gas leakage is a dark image signal, it is difficult to clearly distinguish between this information and the background information, even if the infrared gas absorption is included in an image of the monitoring territory according to the conventional method.

This difficulty of clear distinction between the infrared gas absorption information of gas leakage an the background information occurs also where infrared radiation from the background is detected as it is, as explained hereinbefore, and where an infrared emitter is operated to emit an infrared beam, and the infrared beam radiated or reflected from the background is detected and displayed.

SUMMARY OF THE INVENTION

An object of the present invention, therefore, is to provide a gas visualizing apparatus and method, which requires only a simple construction to obtain reliable image information relating to gas leak conditions including the background, thereby enabling monitoring of an extensive territory depending on the background and/or surrounding conditions.

The above object is fulfilled, according to the present invention, by a gas visualizing apparatus comprising a planar infrared detecting device for detecting infrared light radiated or reflected from a background of a gas leak monitoring territory, a planar infrared emitting device for emitting a detection infrared beam in two-dimensional form toward the gas leak monitoring territory, the detection infrared beam having a wavelength absorbable by a gas to be detected, and a display device for displaying information relating to gas leakage as a two-dimensional visible image corresponding to the gas leak monitoring territory, wherein the planar infrared emitting device includes an irradiated area varying device for converging or diverging the detection infrared beam to vary an area of the gas leak monitoring territory, and the planar infrared detecting device includes a transmission bandwidth varying device for setting a band of the infrared light entering the planar infrared detecting device to a band substantially centering on the wavelength of the detection infrared beam, and varying a width of the band.

Further, the present invention provides a gas visualizing method which utilizes the above gas visualizing apparatus to visualize gas leak conditions in the gas leak monitoring territory and to display the gas leak conditions as a two-dimensional image on the display device.

The functions and effects of the present invention are as follows.

With the gas visualizing apparatus having the above construction, the planar infrared detecting device makes a two-dimensional detection, corresponding to the background, of infrared light traveling through the gas leak monitoring territory, whether the detection infrared beam is emitted or not This detection information includes gas absorption information as well as background information. The gas absorption information is included in a wavelength signal of the detection infrared beam within a band absorbable by the detected gas. The background information is included in all the wavelength signals detected.

This visualizing apparatus includes the irradiated area varying device and transmission bandwidth varying device to adjust a ratio between gas absorption information and background information in a suitable way for transfer to the display device.

That is, the transmission bandwidth varying device varies a transmission bandwidth of signals given to the detecting device. Naturally this bandwidth includes the wavelength of the detection infrared beam. When the transmission bandwidth is varied, an amount of information relating to the background and detected by the detecting device is varied while an amount of information relating to gas absorption remains the same. Accordingly, to be described more particularly later, the visibility of the gas image is assured. This is advantageous not only in the case using the planar infrared emitting means but also in the further case not using the same. for, in the latter case, the absorption spectrum width is narrow at the normal temperature. Thus, with narrower setting of the transmission bandwidth to obtain the minimum necessary amount of background information, a higher detection sensitivity of the detection-target gas may be obtained. Therefore, the above-described construction is effective for increasing the detection sensitivity by providing the means for varying and setting the transmission bandwidth to as narrow a bandwidth as possible as long as the necessary visualized image may be obtained depending on the conditions of the monitoring territory. Generally, a normalization process is carried out at the display side (to make constant a total amount of information processed at the display side). According to the present invention, the transmission bandwidth is varied even if the normalization process is carried out, to provide the display device with a visualized image having a proper ratio of the background information with respect to the gas absorption information. Then, the visualizing process and the gas leak monitoring operation are to be initiated after selection of the transmission bandwidth suitable for the amount of the information relating to the background of the monitoring territory at this point of time. And during this monitoring operation if there occurs no change in the surrounding conditions, there is no necessity of changing the transmission bandwidth, such that during the monitoring the system continues to operate with reduced mechanical movements. As a result, the apparatus of the invention may operate in a stable manner with few mechanical troubles in the case of a monitoring operation for a long period of time.

An ordinary TV device has a gain adjusting unit. Display conditions may be optimized more reliably by varying the transmission and width than by operating the gain adjusting unit in adjusting the signal-to-noise ratio of the visualized image.

Figure 5A:
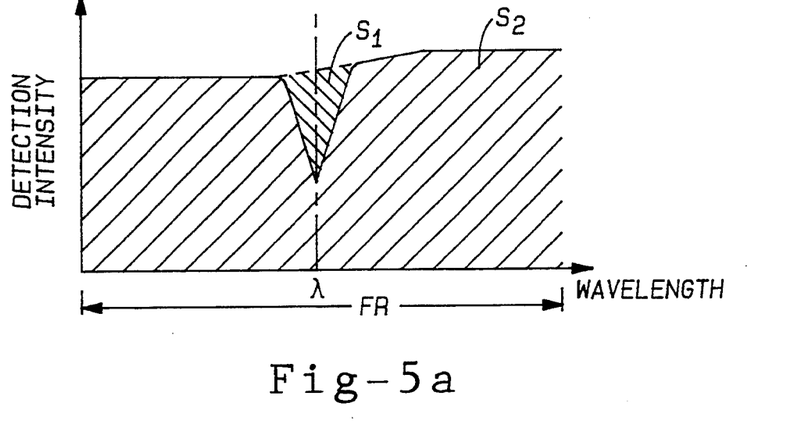
FIG. 5(a), FIG. 5(b) and FIG. 5(c) show detection beam intensities relating wavelengths when the transmission bandwidth is varied by the transmission bandwidth varying means in the background natural radiation condition in a passive monitor operation with FIG. 5(a) showing a case where the transmission bandwidth is restricted to a predetermined bandwidth FIG. 5(c) showing a case where the transmission bandwidth is further restricted to an even narrower bandwidth, respectively.
Figure 5B:
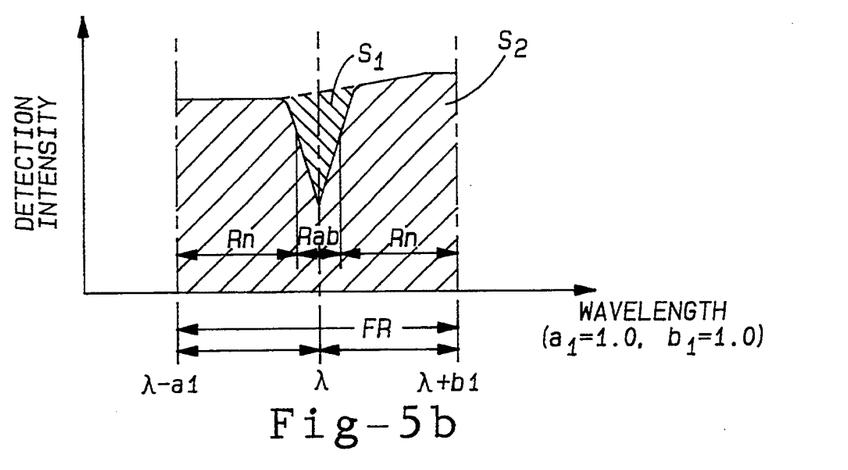
Figure 6A:
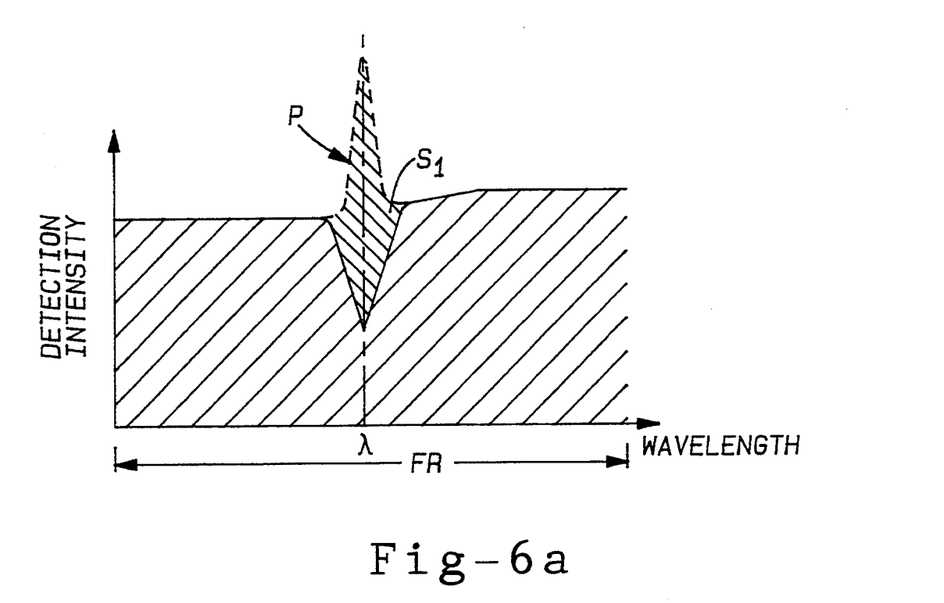
FIG. 6(a), FIG. 6(b) and FIG. 6(c) show detection beam intensities relating wavelengths when the transmission bandwidth is varied by the transmission bandwidth varying means in the infrared beam irradiated condition in an active monitor operation, with FIG. 6(a) showing a case where no transmission bandwidth restriction is present, FIG. 6(b) showing a case where the transmission bandwidth is restricted to a predetermined bandwidth, FIG. 6(c) showing a case where the transmission bandwidth is further restricted to an even narrower bandwidth, respectively.
Figure 6B:
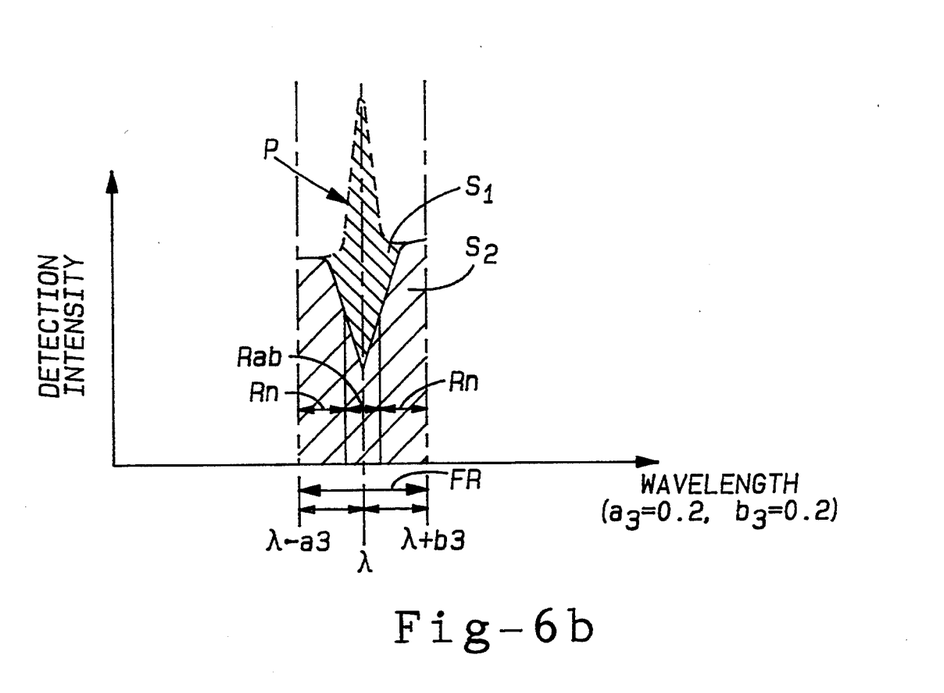

FIGS. 5 and 6 show relations between detected wavelength and wavelength component in a condition of natural radiation and in a condition of infrared emission, respectively (in each figure (a) shows the case of no transmission bandwidth adjustment, while (b) shows the case of limited transmission bandwidth, with the broken lines showing absence of gas leakage, and solid lines showing presence of gas leakage absorbing the infrared beam) The shaded portions of these figures represent ranges of absorption by the gas.

Figure 5C:
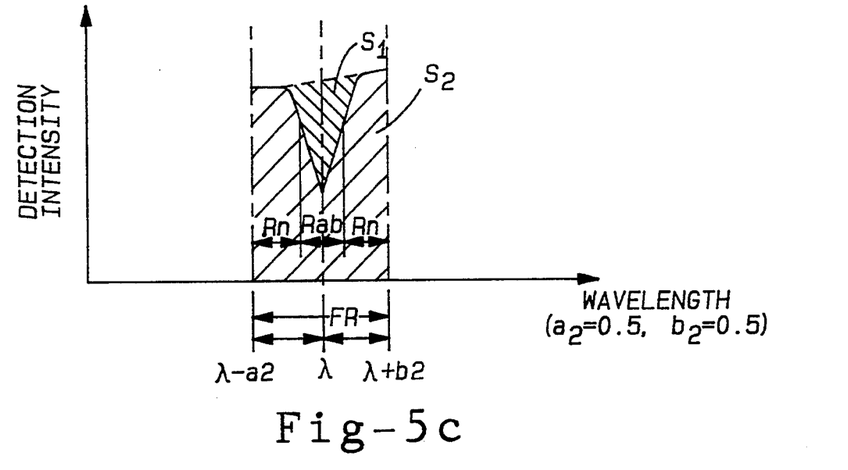
Figure 6C:
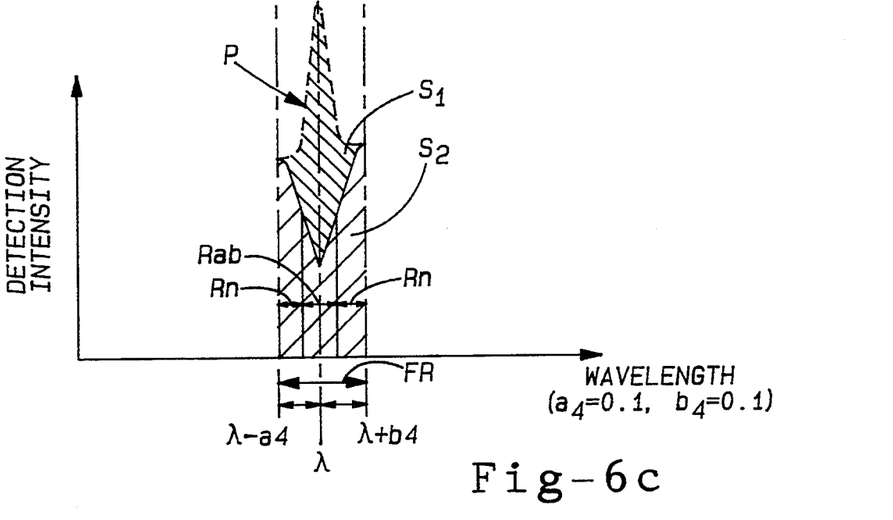

FIGS. 5(a), 5(b) and 5(c) illustrates the relationship between the detection wavelength and the respective wavelength components in the natural radiation condition corresponding to a passive monitor mode to be described later (FIG. 5(a) shows a signal condition without any transmission bandwidth adjustment, and FIGS. 5(b) and 5(c) show signal conditions with restriction of the transmission bandwidth. On the other hand, FIGS. 6(a), 6(b) and 6(c) illustrates the relationship between the detection wavelength and the respective wavelength components in the infrared beam emitting condition corresponding to an active monitor mode to be described later (FIG. 6(a) shows a signal condition without any transmission bandwidth adjustment and FIGS. 6(b) and 6(c) show signal conditions with restriction of the transmission bandwidth.). In these drawings, the broken lines denote a case in which no gas leak is occurring; and the solid lines denote cases in which a gas leak is occurring to cause absorption of the infrared beam thereby Further, the double-shaded portions denote the area absorbed by the gas. Then, in comparison between FIGS. 5(a), 5(b), 5(c) and FIGS. 6(a), 6(b), 6(c), the former denotes the natural radiation condition corresponding to the passive monitor mode. Then, no peak portion P is present in the detected intensity curve of each wavelength in the case of no gas absorption denoted by the broke line. Whereas, in the latter case denoting the infrared beam emitting condition corresponding to the active monitor mode the peak portion P is present More specifically, in the cases of FIG. 5(a) and FIG. 6(a), the entire bands (denoted by FR) shown in these FIGS. 5(a), 16(a) are transmitted, without any filtering operations, directly to the planar infrared detecting means Therefore, although a bright image may be obtained the distinction of the gas is difficult.

On the other hand, in the cases of FIGS. 5(b), 5(c) and of FIGS. 6(b), 6(c), the transmission bandwidths are restricted, i.e. narrowed by the respective filtering operations specifically the transmission bandwidth of the case shown in FIG. 5(b) is $(a_1+b_1)$ those of FIGS. 5(c) 6(b) and 6(c) are $(a_2+b_2)$, $(a_3+b_3)$ and $(a_4+b)$, respectively. Further, with increase of the reference numeral, the narrower the transmission bandwidth becomes This transmission and FR includes at least a portion of an absorption band Rab in which the infrared beam is absorbed by the gas to be detected and includes also adjacent bands Rn adjacent the absorption band Rab and where the beam is not absorbed by the gas Further this transmission band is centered about the detection wavelength $\lambda$ or the wavelength of detection infrared beam Then, as will be described later in the embodiments such filtering operations (i.e. limiting operations of the transmission and width) causes a change in the S/N ratio of the display means. More specifically, taking the case of FIG. 5(b) for instance, the gas absorption amount corresponds to the ratio between the detection intensity S2 in FIG. 5(b) (the area below the broken line and the opposed solid lines continuous with the broken line, i.e. the area denoted by the single shading) and the detection intensity S1 (the area shown with the double shading). Thus, the greater the value, the easier the distinction of the gas becomes. Accordingly, a variation of this ratio corresponds to be variation in the background information amount and the gas absorption information amount. Consequently, the restricting operation of the transmission bandwidth determines the distinguishability of the gas Therefore, the operator, while watching the screen on CRT for instance may obtain a readily distinguishable gas image against the background within the single monitor image by adjusting the transmission bandwidth The transmission bandwidth varying device operates effectively whether the infrared emitting device is in operation or not. The irradiated area varying device operates effectively when the infrared emitting device is in operation. The irradiated area varying device varies an area of the territory irradiated by the detection infrared beam. Thus, where the detecting device monitors a fixed area, a variation in the area, by the same principle as noted above, results in a variation in the ratio of the background information with respect to the gas absorption information a reflection amount of the detection infrared beam per unit area is varied. The ratio made appropriate in this way is used to produce a visualized image.

Figure 7A:
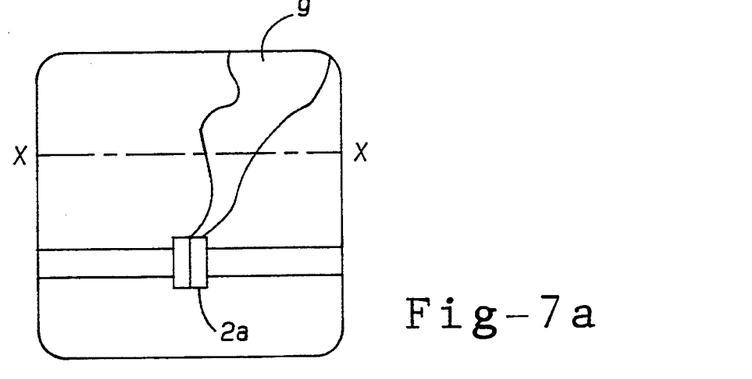
FIG. 7(a) and FIG. 7(b) are views to illustrate lower detection limits of the detection gas concentration due to the infrared beam reflection intensity from the background in association with a variation in an infrared beam irradiation area, with FIG. 7(a) showing a condition of the monitoring territory, FIG. 7(b) showing a display limit gas concentration taken along a line X—X in FIG. 7(a), respectively
Figure 7B:
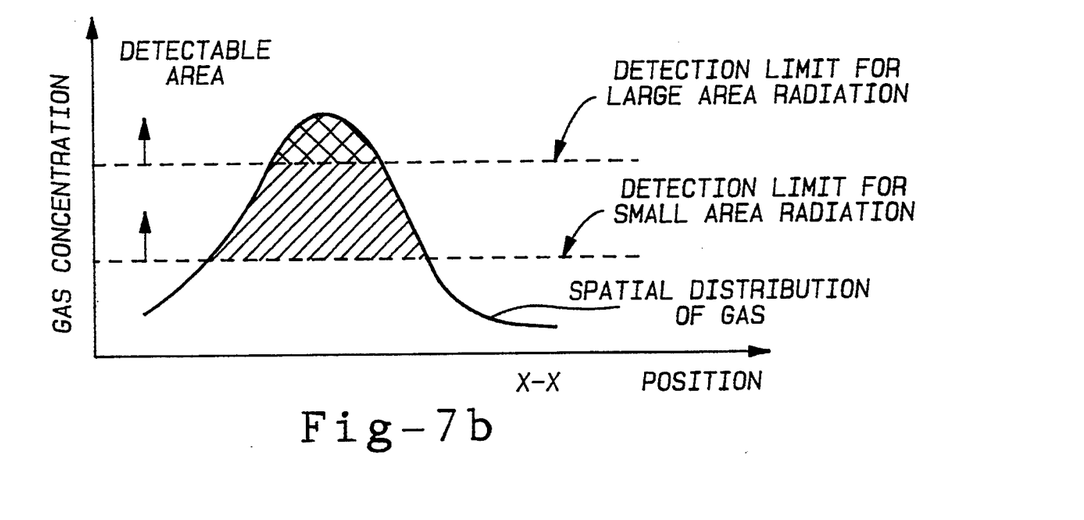

Thus, when the detection infrared beam is emitted with a large angle of visibility covering a relatively large area, in a relatively wide range, a relatively high concentration gas area is displayed on the display device. When the irradiated area varying device selects a certain area to be irradiated by the detection infrared beam, in a relatively narrow range, a relatively low gas concentration may also e displayed with good contrast. That is to say, depending on the condition of the background to be monitored, it is possible to select a well balanced point suitable for monitoring between the contradicting factors of the area to be visualized by the infrared beam irradiation and the detection gas concentrations. FIG. 7(a), FIG. 7(b) shows limits of gas concentration detection in conditions of large area irradiation and small area irradiation.

FIG. 7(a) shows a condition where the detection-target gas is leaking In this X—X section shown in FIG. 7(a), in case the irradiation area is set large, only its high-concentration area denoted with the double shading is to be displayed. Whereas, in case the irradiation area is set small, its lower-concentration area denoted with the single shading too is to be displayed.

With such visualizing apparatus, the monitoring operation of the monitor territory is initiated after first effecting adjustments of the transmission bandwidth varying means and the irradiation area varying means, such that the construction of the apparatus may be simple since any changing operations of the filter or of the wavelength of the beam source are not necessary during the monitoring operation. However, the visualized image obtained by this apparatus comprises a composite image of the background image and the visualized gas image. The discrimination of the target gas along is considerably difficult. For this reason, it is almost practically impossible to employ the visualizing apparatus as it is as the primary detecting means for a gas leak monitoring operation. Then, in the case of the gas leak detection at a domestic or factory situation, the diffusing condition of the gas tends to vary greatly due to change in air current since the gas leak amount is relatively small, an also in such situation there generally are a relatively few number of animated objects in the surroundings or the background. By taking these factors into consideration, there is provided an image processing means for discriminating gas leakage based on time variation of the image (see FIG. 3). In place of the conventional arrangement where the gas discrimination is affective by means of a plurality of image photographic operations using difference absorption or changing of filters, the same object is fulfilled by the combination of the image processing device and the visualizing apparatus having a simple construction which does not require changing of the beam source or the changing of the filters during monitoring.

Accordingly, a convenient an inexpensive gas visualizing apparatus has been achieved. Further, by using the gas visualizing apparatus of the present invention it is possible to instantly determine the gas leaking position from a distant location, such that a user may immediately start to investigate the cause of the gas leakage and to take necessary safety measures.

Thus the present invention provides a convenient and inexpensive gas visualizing apparatus. With the gas visualizing apparatus according to the present invention, a location of gas leakage may be identified instantly from a remote place. This enables causes of the leakage to be found out and safety measures to be taken promptly.

This gas visualizing apparatus my further include a monitor mode switching device for switching between a passive monitor mode in which only the planar infrared detecting device is operated to detect the infrared light radiated from the background of the gas leak monitoring territory, detection information thereby obtained being displayed on the display device as the information relating to gas leakage, and an active monitor mode in which the planar infrared emitting device and the planar infrared detecting device are operated, the detection information provided by the planar infrared detecting device being displayed on the display device as the information relating to gas leakage.

In the passive monitor mode, the planar infrared detecting device detects infrared radiation from the background of the gas leak monitoring territory (e.g. a gas-related installation such as a spherical gas holder, and natural objects such as plants and trees), to roughly grasp conditions of gas leakage. When danger is felt of the rough precision monitoring of the gas leakage, the mode switching device is operated to establish the active monitor mode to emit the detection infrared beam. Then, the gas leakage may monitored with high precision based on intensity of the infrared beam reflected from the background. Such a gas visualizing apparatus enable gas leakage to be detected with high precision while prolonging life of an infrared laser emitter acting as a light source and saving power consumption by the light source.

The larger the area that is covered, the greater the output that is required of the laser Further, since a portion of the image under the passive monitor mode may be monitored under the active monitor mode by using the laser having its irradiation area restricted by the irradiation area varying means. According to the present invention, only a limited area is monitors by using the laser, a great laser output is not essential.

Further the gas visualizing apparatus according to the present invention may include a reference planar infrared emitting device for emitting a reference infrared beam in two-dimensional form toward the gas leak monitoring territory, the reference infrared beam having a wavelength little absorbable by the gas to be detected, and a gas concentration operating device for obtaining reference absorption information from a ratio between emission intensity and reception intensity of the reference infrared beam, and absorption information from a ratio between emission intensity and reception intensity of the detection infrared beam, to obtain gas concentration information based on a difference between the absorption information and the reference absorption information, the gas concentration information being displaced on the display device as the information relating to gas leakage. This construction enables an accurate confirmation of a leaking gas concentration as well.

The foregoing and other objects, features and advantages of the invention will be apparent from the following more particular description of preferred embodiments of invention, as illustrated in the accompanying drawings.

DETAILED DESCRIPTION OF THE PREFERRED EMBODIMENTS

Figure 1:
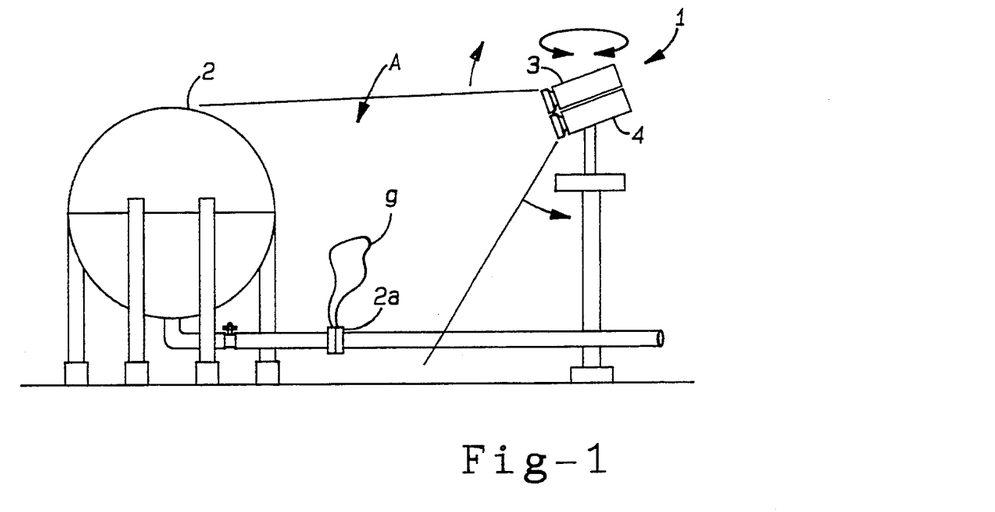
FIG. 1 is a view showing a gas visualizing apparatus in use.

An embodiment of the present invention will be described with reference to the drawings. FIG. 1 shows a gas visualizing apparatus 1 of the present invention installed in a gas manufacturing plant to monitor gas leakage in a territory adjacent a spherical holder 2 (including a flange connection a of piping connected to the holder 2). That is, this figure illustrates an embodiment for monitoring and detecting for leakage of a combustible gas (g) as the detection object gas, with a gas leak monitoring territory A including the spherical holder as a background Selection of wavelength of an infrared beam used for detection (as a detection infrared beam, and a measurement principle employed in the gas visualizing apparatus 1 of the present invention will be described first. A particular infrared beam traveling through gases is absorbed by the combustible gas (i.e. gas "g" to be detected). This relationship is expressed by the following equation:

$$Io = Ii \times exp[-\alpha(\lambda) \times 1 \times c] \text{(Lambert-Beer's Equation)}$$

where Ii and Io are intensities of incident light and transmitted light, respectively, (λ) is an absorption coefficient determined by gas type and infrared wavelength, I represents a length of interaction between infrared beam and gas, and c represents a gas concentration Thus, when the gas "g" to be detected is present on an optical path, the infrared beam is absorbed by the gas to weaken its intensity. This may be detected two-dimensionally and displayed on a CRT two-dimensionally. The resulting two-dimensional variable density image shows a distribution of gas "g" in the gas leak monitoring territory.

The Inventors have investigated absorption characteristics of methane, propane and butane as gases "g" to be detected. It has been confirmed as a result that these gases have a common absorption wavelength in a 3 micrometer band. Table 1 shows absorption coefficients of the respective gases experimentally obtain where an He—Ne laser (with an emission wavelength at 3.39 micrometers) is used as a light source.

TABLE 1

| Absorption Coefficients of Gases to be Detected | |
|---|---|
| gas | absorption coefficient [atm−1 cm−1] |
| methane | 9.0 |
| propane | 8.4 |
| n-butane | 12 |
| i-butane | 12 |

These results show that by using an He—Ne laser as light source, the construction noted above realizes visualization, based on use of infrared absorption, of methane, propane and butane at the same time At liquefied natural gas terminals, for example, not only methane, but propane, butane and the like are used for carburation purpose The fact that the same apparatus can monitor leakage of these gases provides a great advantage in terms of equipment cost.

Figure 2A:
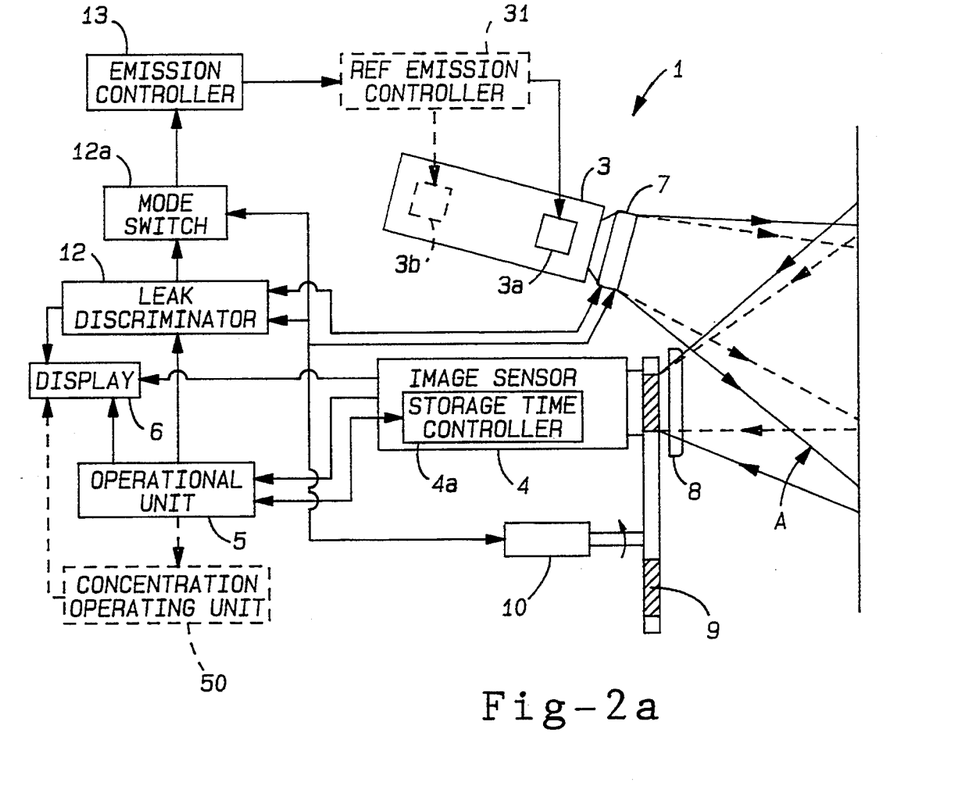
FIG. 2(a), FIG. 2(b), FIG. 2(c) and FIG. 2(d) show the construction of the gas visualizing apparatus with FIG. 2(a) showing the details of the construction of the entire apparatus, FIG. 2(b) showing the apparatus construction for the active monitor mode, FIG. 2(c) showing the apparatus construction for the passive monitor mode FIG. 2(d) showing the apparatus construction for the passive/active combination monitor mode, respectively.
Figure 2B:
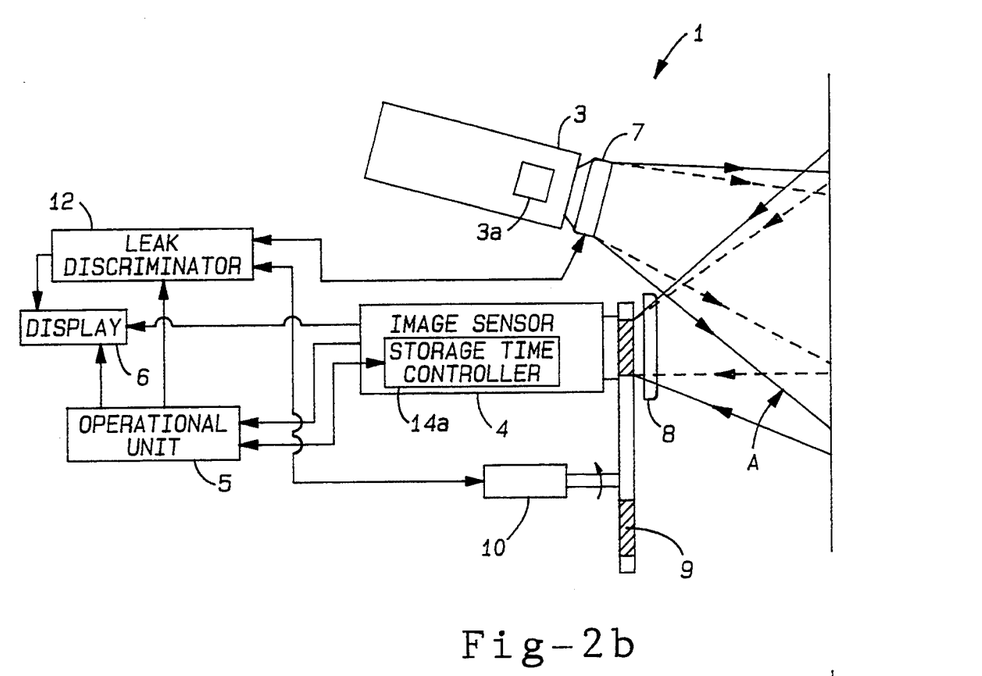
Figure 2C:
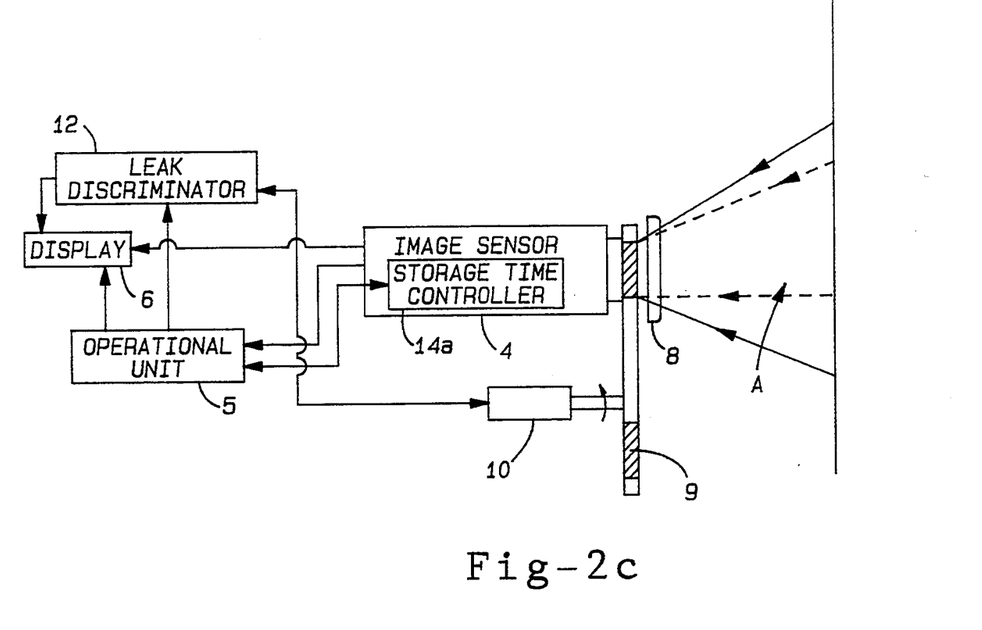
Figure 2D:
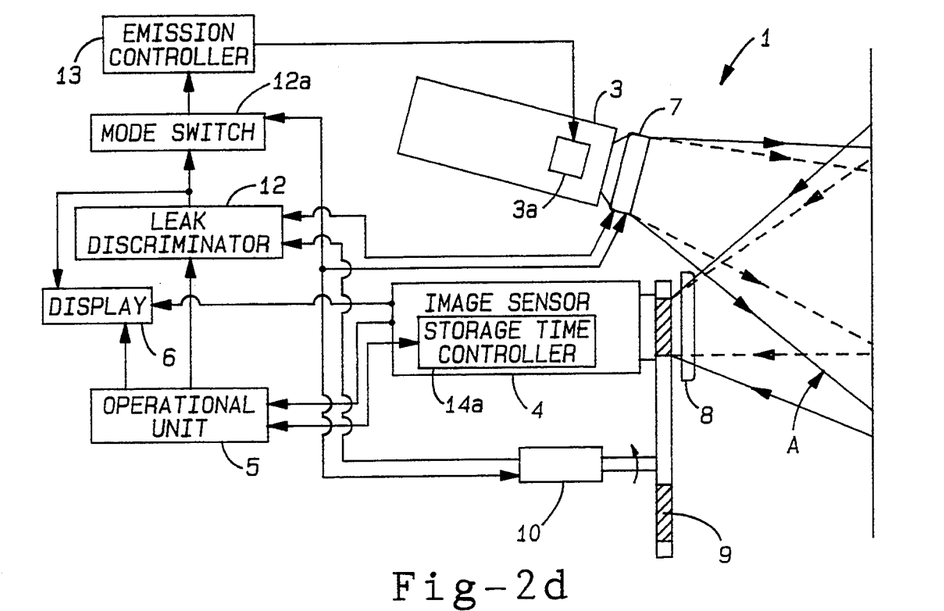

Details of the gas visualizing apparatus 1 according to the present invention will be described with reference to FIG. 2(a). The gas visualizing apparatus 1 includes an infrared laser 3 (with a laser source 3a) acting as a planar infrared emitting device, and an image sensor 4 acting as a planar infrared detecting device The infrared laser 3 emits an infrared beam in two-dimensional form to the gas leak monitoring territory A The infrared beam is of wavelength to be absorbed by the combustible gas "g" to be detected, such as methane, propane or butane. The image sensor 4 detects infrared beams radiated or reflected from the background and traveling through the gas leak monitoring territory A. The gas visualizing apparatus 1 further includes an operational unit 5 for processing detection information received from the image sensor 4, and a CRT 6 for displaying the processed information relating to gas leakage as a two-dimensional visible image.

Figure 3:
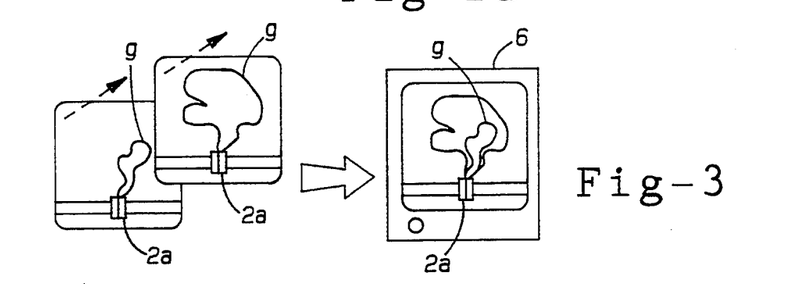
FIG. 3 is a view showing conditions of a leaking gas varying with lapse of time as presented on a display unit

With this construction, the information detected by the image sensor 4 is processed, and displaced as information relating to gas leakage on the CRT 6 for observation by monitoring personnel. FIG. 3 shows displays made on the CRT 6. Here, as shown in FIG. 3, images of the gas are sampled at different points of time; then, if there is a change in the position of the gas image in these images, an image processing operation is effected for emphasizing this change to obtain a processed image as shown on the right hand view in FIG. 3 (the border region of the detected gas after lapse of a predetermined time period is emphasized) That is to say, as the gas leak relating information, the visualized image of the detection-target gas and the background image are distinguished from each other through the image processing operation by an operational unit 5 and then these images may e displayed on the CRT 6 with the emphasis being placed on the detection-target gas portion as shown in FIG. 3.

The gas visualizing apparatus 1 according to the present invention is selectively operable in a passive monitor mode and an active monitor mode. In the passive monitor mode, only the image sensor 4 is operated to detect mainly infrared beams radiated from the background of the gas leak monitoring territory A, and detection information is displayed on the CRT 6 as the information relating to gas leakage. In the active monitor mode, the infrared laser 3 and image sensor 4 are operated and the resulting detection information is displayed on the CRT 6 as the information relating to gas leakage. The apparatus is further provided with a passive/active combination mode in which both the passive monitor area and the active monitor area may be displayed in a mixed state on a same single screen on the display unit These methods can be characterized as follows, in the gas visualizing performance, the complexity of the construction (costs) and the frequency of the use of the laser beam source.

visualizing performance (visualizing lower limit of the detection-target gas concentration)
  passive monitor≦combination≦active monitor
complexity of the construction (manufacturing and maintenance costs)
  passive monitor≦active monitor≦combination
life span of laser beam source (usable time period of the gas laser having a finite life)
  active monitor<combination.

Figure 4A:
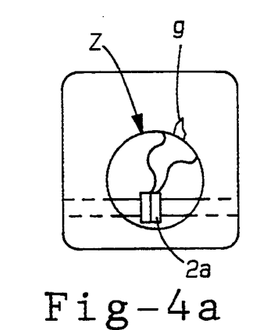
FIG. 4(a), FIG. 4(b) and FIG. 4(c) show images under the passive/active monitoring condition, with FIG. 4(a) showing an image when the infrared beam is irradiated to a relatively small area, FIG. 4(b) showing an image when the infrared beam is irradiated to a relatively large area, FIG. 4(c) showing an image under a zoomed-up condition, respectively.
Figures 4B, 4C:
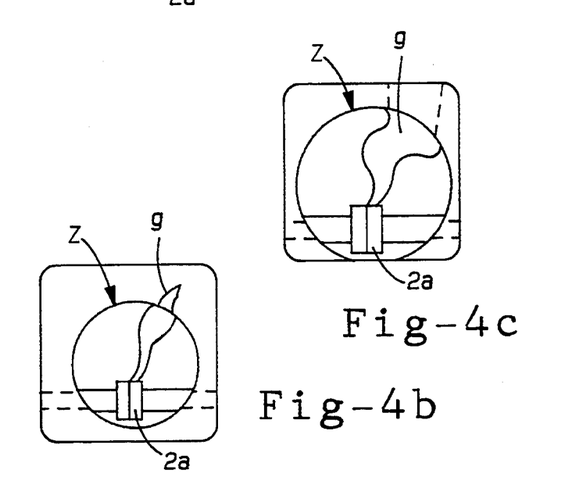

Of the above the visualizing performance will be described with reference to the visualized image shown in FIGS. 4(a), (b) obtained by the passive/active combination method. In these drawings, the area within a circle Z represents the portion irradiated by the detection infrared beam; and FIG. 4(c) shows the image obtained by a zooming-up operation In FIG. 4(a), within a passive monitor image which comprises the heat radiation image of the background, and at the center of this image, there is composed an active monitor image obtained by irradiation of the infrared beam by the planar infrared beam emitting means. The active monitor mode image portion is brighter than the rest by the amount of the reflected beam component of the irradiated infrared beam and has a higher gas absorption ratio, so that this portion can visualize gas of a lower concentration As a result, even with the same gas cloud, the active monitor mode can make this gas cloud appear more distinct than the passive monitor mode. Further, if the irradiation area is expanded as shown in FIG. 4(b) by a beam expander 7 to be described later, the active monitor image area increases accordingly. Then, if the power of the planar infrared emitting means remains constant, there occurs corresponding reduction in the irradiation beam intensity per unit area, so that the visualized gas cloud becomes smaller. FIG. 4(a) shows a difference in the gas leak monitoring territory between the two modes. The gist of the above system lies in improvement in output of the infrared laser 3 and sensitivity of the image sensor 4. This is achieved by a beam expander 7 casting as an irradiated area varying device, a zoom mechanism 8 acting as a detected area varying device, and a transmission bandwidth varying device including band-pass filters 9 and a switching mechanism 10.

The respective components will be described successively hereinafter.

The image sensor 4 detects the infrared beams having passed through the gas leak monitoring territory A. These infrared beams may be those radiated from gas-related installations such as the spherical holder 2 and natural objects such as standing trees which constitute the background of the gas leak monitoring territory A, or the beam emitted from the infrared laser 3 for detection purposes and reflected from the background. The image sensor 4 further detects infrared intensity of a band including the wavelength of the infrared beam emitted from the infrared laser 3.

The image sensor 4 is used in both the passive monitor mode and active monitor mode The image sensor 4 has the transmission bandwidth varying device including the plurality of band-pass filters 9 and switching mechanism 10, as well as the zoom mechanism 8, which are unique to the present invention. FIG. 4(c) shows an image provided when the zoom mechanism 8 in operation.

When, in the passive monitor mode, the gas to be detected has a sufficient spectral band width of infrared absorption, the image sensor 4 can use, as light source infrared radiation from the background objects by Planck's law of radiation. The band-pass filters 9 are arranged in front of the sensor 4 to obtain an improved signal-to-noise ratio (or S/N ratio, in which S is an infrared intensity mainly representing a gas concentration, and N is a signal other than the infrared beam used for detection and mainly representing the background). Thus, a transmission bandwidth (half bandwidth) of transmission wavelengths entering the image sensor 4 through the band-pass filters 9 is selected so that a sufficient quantity of light is provided for the sensor 4 and a high S/N ratio, for gas detection is assured. The selection and installation principle of the band-pass filters 9 will be described in greater detail hereunder.

Where a single band-pass filter 9 is used, the image displayed on the CRT 6 may be too bright or too dark, regardless of the passive or active monitor mode, under the influence of the temperature of the background or sunlight or the like. For instance, if the temperature in the 3 to 5 um band varies from 0 to 20 degrees in Celsius, the radiation amount increases for more than two times. Further, depending on the irradiation condition of the sun light, the radiation amount will vary for an even greater degree. Further, even if an image is displayed on the CRT 6 with the same degree of brightness, contrast on the CRt screen may be too low relative to a gas concentration monitored. Thus, a problem that presence of the gas cannot be confirmed visually may arise even if an image appears on the CRT screen. To solve such a problem, the band-pass filter 9 should have a half bandwidth that provides a sufficient energy of heat radiating light from the background and reflected sunlight during the day in relation to the sensitivity of the image sensor 4 and assures a signal-to-noise ratio of the absorption by the detected gas. However it is difficult to maintain this half bandwidth constant since sunlight energy is variable to a great extent. According to the present invention, in order to display an image on the CRT 6 with appropriate rightness and excellent contrast, the transmission bandwidth varying device is provided to change the band-pass filters 9 for varying the half bandwidth according to variations in sunlight and heat radiation from the background.

Table 2 shows results of a simulation experiment using propane gas and the passive monitor method conducted to illustrate the influence on the displayed gas image brightness by the transmission bandwidth varying means (band pass filters 9) and the relative reduction in the beam intensity due to the restriction of the transmission bandwidth. In here, the gas absorption amount comprises the ratio between the detection intensity S2 of the no gas leak condition shown in FIG. 5(b) and the detection intensity S1 reduced by the gas absorption. The greater this value, the easier is the discrimination of the gas. Further, the relative beam intensity comprises the variation in the beam intensity with the change of the transmission bandwidth on the assumption that the brightness has the value of 100 in the case of the 2 $\mu$m transmission bandwidth. Thus, the greater this value, the higher the display image brightness and thus the better the visibility. As may be understood from this table, with the use of 0.1 $\mu$m band pass filter, the propane gas having 2000 ppm concentration causes as much as 72.3% reduction in the display image brightness so that gas detection operation of high sensitivity may be expected. However, in this case, since the relative image brightness is only 0.3% of that obtained with the use of 2 $\mu$m band pass filter, depending on the sensitivity of the infrared beam image sensor employed the entire display image will be low in brightness to make the gas discrimination difficult. This image brightness greatly varies depending on the temperature of the background, the sun light or the like and the absorption spectrum of the gas too varies depending on the kind of the gas. Therefore, it is essential that an appropriate band pass filter suitable for each particular situation be selected. influence of band pass filter in the passive monitor method detection-target gas: propane gas gas concentration: 2000 ppm background temperature: 300 K.

TABLE 2 influence of band pass filter in the passive monitor method
detection-target gas: propane gas
gass concentration: 2000 ppm
background temperature: 300K

| transmission bandwidth | gas absorption amount (%) S1/S2 | relative change in brightness |
| --- | --- | --- |
| 0.1 $\mu$m | 72.3 | 0.3 |
| 0.25 $\mu$m | 46.0 | 1.5 |
| 0.5 $\mu$m | 23.0 | 4.4 |
| 1.0 $\mu$m | 20.0 | 11.6 |
| 2.0 $\mu$m | 1.3 | 100.0 |

When the gas "g" leaks in a small quantity, the visualized image thereof may be small in size. Such a case requires a localized confirmation of the leakage to be made by a zooming operation. Conversely, in the event of leakage in a large quantity, localized monitoring is inadequate. To cope with this situation, the zoom mechanism 8 is disposed on a light-receiving side of the image sensor 4 to vary an angle of visibility for monitoring.

The storage time of the image sensor 4 is used in adjusting sensitivity of the sensor 4. Particularly when the transmission bandwidth is narrowed in order to improve the signal-to-noise ratio the brightness on the screen may be insufficient due to a lack in quantity of light detected by the sensor 4. In such a case image brightness is secured by increasing the storage time without saturating screen brightness. This can increase the sensitivity of the image sensor 4. However, if the accumulation time period is extended excessively, it may become impossible to follow the diffusing movement of the leaking gas. Therefore, the accumulation time period should be set to an appropriate value with consideration to these. This is done by a storage time controller 4a included in the image sensor 4.

The components taking part in the emission of the infrared beam for detection purposes will be described hereinafter. These components include the infrared laser 3 acting as a planar infrared emitting device and the beam expander 7 acting as an irradiated area varying device The infrared laser 3 employed provides a wavelength agreeing with the wavelength to be absorbed by the detected gas "g". The laser output is selected such that the energy of the laser expanded for the monitoring territory A an reflected from the background is not less than a sum of the heat radiating energy of the background and the energy of sunlight of the day reflected from the background. Thus, a sufficient quantity of light is obtained from the infrared beam emitted for detection purposes during the daytime as well as nighttime.

The beam expander 7 is provided to vary the arrangement of expansion of the laser to vary intensity of the reflected light per unit area in order to avoid a situation where the infrared beam emitted for detection purposes is relatively difficult to detect under excessive influences of the background and sum. Further in an actual situation, the distance to the background will greatly vary. If this distance from the infrared laser 3 to the background varies by 'n' times, the laser beam irradiation area becomes $1/n^2$ if the condition of the beam expander 7 is maintained constant, whereby the laser irradiation amount significantly varies depending on the distance and the variation in the S/N ratio dependent on the distance to the background will decrease. Hence, the image sensor 4 may not be able to detect the leaking gas. In such case, in order to limit the gas leak monitoring territory A, the laser irradiation angle needs to be narrowed by means of the beam expander 7. As described above, in order to assure the detection capability in the case of a great distance to the background, the beam expander 7 provides an important function.

Further, if more than one picture element sensors detect gas leak through infrared beam absorption with maintaining the condition of the beam expander 7 constant, a detailed confirmation becomes necessary through enlargement of the gas leaking area (assuming the magnification ratio is $n^2$). Then, with the zoom-up operation by the zoom mechanism 8, the image of the leaking gas too becomes magnified by $n^2$. The amount of laser (including the gas leak information) received by each of the picture element sensors sensing the gas leak deceases to $1/n^2$, so that the gas leak detection may become impossible. In such case, in order to maintain the same gas leak detection capability, it is necessary to activate the beam expander 7 to narrow the infrared beam irradiation angle so as to narrow the infrared irradiation area to $1/n^2$ Accordingly, the beam expander 7 provides an important function in case a detailed confirmation is necessary through a magnification of the gas leak condition with a zoom-up operation. Hence the zoom mechanism 8 works as a detection area varying means The beam expander 7 normally is designed to form a collimated beam. However, the present system can operate with diffused light and does not require a high degree of precision Thus an inexpensive beam expander may be used.

The infrared image sensor 4 has a monitoring range variable with distance when the view angle remains the same. When the distance to the background is increased, the collimated light from the laser results in a reduced territory monitored on the screen in the active monitor mode, thereby impairing recognizability. For this reason, the expansion angle is variable within a range smaller than the angle of visibility of the image sensor 4. In the present system, the laser may provide multi-mode emission. Where the laser provides a wavelength of 3.39 micrometers, a multi-mode emission band is as narrow as 300 megaHz. This is included in an absorption band of methane. thus, the laser beam obtained in the multi-mode emission may be used as it is after expanding it with the beam expander 7. It is therefore unnecessary to reduce to a single wavelength the laser beam obtained in the multi-mode emission and including numerous wavelengths as in the case of an ordinary laser emitter. This allows an increase in laser output. Further, a pulse laser may be used only if synchronized with response speed of the image sensor 4.

Formation of variable density images to be displayed on the CRT 6 will be described next.

In the presence of gas "g" in the gas leak monitoring territory A, the infrared beam emitted for detection purposes is absorbed as it travels forward (only in the active monitor mode) and backward. Since concentration of the gas "g" is different from location to location, differences in absorption rate result in spatial differences intensity of the infrared beam (in different positions of a two-dimensional image). This light-reception information is displayed as a variable density image on the CRT 6. Thus, the image is information having a mixture of image information on the background of the gas leak monitoring territory A and image information on leak conditions of the detected gas "g".

The monitoring personnel are able to confirm visually through the display the background of the gas leak monitoring territory A and distribution of the gas "g".

Generally, the background is stationary whereas the gas to be detected is in a state of flux It is therefore possible to detect gas leakage automatically, by comparing image information obtained at one time and that obtained at another time.

The gas visualizing apparatus 1 of the present invention further includes a gas leak discriminator 12 a mode switcher 12a and an infrared emission controller 13. These devices 12 and 13 are linked to the operational unit 5, and constitute a detection information processing system.

When the band pass filter 9 is not changed, the gas leak discriminator 12 has a processing system for checking presence or absence of gas leakage by comparing detection information obtained at different points of time. In a site such as this where gas monitoring is required, the background generally is stationary and the leaked gas "g" to be detected is in a state of flux. Thus, by comparing images of information obtained at different points of time conditions of the gas leakage may be grasped. This construction will be described more particularly next.

Now, assume that the image sensor 4 provides a brightness signal Vij(t) for a picture element of line 'i', column 'j' at a point of time 't'. Then, since the leaking gas diffuses in the air. There always occurs a time-related change in a brightness signal associated with a certain picture element Therefore, of all the picture elements constituting the visualized image, by effecting a linear time-differentiation operation on a brightness signal of a same picture element, the changing portion may be extracted from the image.

That is, the linear time-differentiation operation may be expressed as:

$$dVij(t) = [Vij(t+\Delta t) - Vij(t)/\Delta t > C$$

or, $$[Vij(t+\Delta t) - Vij(t)] > C \times \Delta t$$

where, $\Delta t$ represents a very short time period.

Incidentally by obtaining a difference of the image information Vij at a different point of time $(t+\Delta t)$, it is possible to grasp the condition of the gas leak. This situation (gas distributions of different points of time are displayed in an overlapping manner) is shown in the aforementioned FIG. 3. Then by monitoring this situation in FIG. 3 by means of the CRT 6 the operator may determine presence/absence of gas leakage. Alternatively, if the threshold value C is set in advance, it is also possible to make an arrangement such that the calculation operation unit automatically effects the calculation repeatedly at certain intervals and a gas leak warning is issued when the above-described condition of the equation is satisfied.

Further, if a quadratic time-differentiation operation is effective on the brightness signal V, it becomes possible to extract the changing portion in the image where the irregular brightness change is occurring. That is:

$$d^2Vij(t)/d^2 = [2 \times Vij(t) - Vij\ j(t+\Delta t) - Vij$$
$$(t-\Delta t)/\Delta t_2 > C$$

or, $$2 \times [Vij(t) - Vij(t+\Delta t) - Vij(t-\Delta t)] > C \times \Delta t^2$$

As described above, if the threshold value C is set in advance, through comparison of the threshold value C, $C \times \Delta t$, $C \times \Delta t^2$, when there occurs a change that the calculated value of the left side of the above equation for the picture element of line 'i', column 'j' of the infrared image sensor exceeds the preset threshold value C, the gas leak warning may be automatically issued. Here, this calculation of the equation is executed by the operational unit 5 and the judgement of the calculated result for the determination of presence/absence of gas leakage is affected by the gas leak discriminator 12 in which the predetermined threshold value is stored in advance.

The threshold value C is automatically selected to be suitable at the time of the particular monitoring, depending on the type of the visualizing mode, i.e. the active monitor mode or the passive monitor mode and also on the setting conditions of the irradiation area varying means 7 and the transmission bandwidth varying means 9 FIG. 3 shows such conditions (gas distributions occurring at different points of time are shown in superimposition).

The mode switcher 12a effect is switching from the passive monitor mode to the active monitor mode when the gas leak discriminator 12 confirms gas leakage. At this time, the mode switcher 12a controls the infrared radiation controller 13 to drive the infrared laser 3 The mode switcher 12a simultaneously operates the switching mechanism 10 to vary the transmission bandwidth and the beam expander 7 to reduce the radiated area, thereby concentrating the monitoring on a particular location of gas leakage.

A comparison is now made of the passive and active monitor modes. In the passive monitor mode, a band-pass filter 9 providing a wider bandwidth is selected since background information forms a main part of a truly necessary infrared intensity signal detected by he image sensor 4. On the other hand, when the infrared beam of great energy emitted for detection purposes in the active monitor mode and reflected from the background is detected, the processing system normalized for expressing density variations in the passive monitor mode is incapable of discerning the density variations since the intensity signal having wavelengths near the detection wavelength is saturated at a certain level or above. In case of the passive mode, hence, the mode switcher 12a normally selects the band-pass filter 9 of wider band width for a reduced signal-to-noise ratio. When the infrared beam 3 is driven, the mode switcher 12a is operable to drive the transmission band switching mechanism 10 for selecting a band-pass filter 9 of narrower bandwidth. This increases the signal-to-noise ratio for detailed observation of an extent of gas leakage. FIG. 5(b), FIG. 5(c), FIG. 6(b), FIG. 6(c) show the changing of the transmission bandwidths. In FIG. 5(b), FIG. 5(c), FIG. 6(b), FIG. 6(c), the transmission and is denoted by the mark FR, and its transmission bandwidth is denoted by 'a+b' (with small numerals). Further, in FIGS. 5(b), 5(c) corresponding to the passive monitor mode, the transmission bandwidth $(a_1+b_1)$ is set to 2 um in FIG. 5(b), the transmission bandwidth $(a_2+b_2)$ is set to 1 um, in FIG. 5(c) Further, in FIG. 6(b), the transmission bandwidth $(a_3+b_3)$ is set to 0.4 um, and in FIG. 68(c), the transmission bandwidth $(a_4+b_4)$ is set to 0.2 $\mu$m respectively. Specifications of the gas visualizing apparatus 1 described above are listed hereunder.

Infrared Laser 3
Type: helium-neon laser
Nominal output: 8 mW
Central wavelength: 3.39 micrometers
Width of Band-pass filters 9 a+b: 0.1 to 2 micrometers Where, the reference marks(a) and (b) respectively denote upper and lower limits (or half bandwidths) of the transmission and of the filter to the above-mentioned central wavelength of the detection infrared beam. These limits can be varied by switching over the filters.
Examples of a+b
  sunny day, active mode, detection-target gas: methane
  a+b: 0.1 to 0.2 micrometer
  sunny day, passive mode, detection-target gas: propane or butane
  a+b: 1 micrometer
  nighttime, passive mode, detection-target gas: propane or butane
  a+b: 2 micrometers
  Angle of visibility: image sensor's angle of visibility
  Distance to Background: several meters to several hundreds of meters
Image Sensor 4
  Detection wavelength range: 3 to 4 micrometers
  Max. detection temp.difference: 0.15° C. or below (NETD)

Operation of the gas visualizing apparatus 1 will be described next.

(1) In the passive monitor mode, the image sensor 4 detects infrared radiation (radiant heat) from the background of the gas leak monitoring territory A, and the gas leak discriminator 12 determines presence or absence of gas leakage. In this state, the half bandwidth of the band-pass filters 9 is controlled to provide a quantity of light that enables confirmation of the background with a minimum brightness required for monitoring. At this time, a relatively large transmission band is selected for the band-pass filters 9.

(2) In the event of gas leakage, the gas leak discriminator 12 determines presence of gas leakage with a two-dimensional shift or a region of absorption of infrared rays having a predetermined wavelength. This operation of the gas leak discriminator 12 utilizes a shift, with lapse of time, of the region where the infrared rays having the predetermined wavelength are absorbed (3) When the gas leak discriminator 12 determines, broadly, occurrence of gas leakage, the infrared radiation controller 12 drives the infrared laser 3 to emit an infrared beam toward the background. This enables determination, with high precision, of gas leakage based on the intensity of the infrared beam reflected from the background.

at this time, the beam expander 7 an transmission band varying device 10 are adjusted to transmit an image signal with a high signal-to noise ratio, thereby to provide reliable visualized information. The above embodiment may be modified as follows:

(a) In the described embodiment,the infrared laser 3 emits a single infrared beam for detection purposes This infrared beam has a wavelength to be absorbed by the combustible gas "g". An additional emission system may be provided to emit a reference infrared beam having a wavelength not readily absorbed by the gas "g" (As shown in FIG. 2(a), this additional emission system includes a reference infrared emission controller 31 and a reference infrared laser source 3b, both marked in broken lines ) Then, gas concentration may also be detected, with the infrared beam of the wavelength not absorbed by the gas providing reference information, and pixel information based on the absorbable wavelength providing gas leak information. That is, the gas visualizing apparatus 1 further includes a gas concentration operating unit 50. Reference absorption information is derived from Lambert-Beer's equation based on the logarithm of a ratio between emission intensity and reception intensity of the reference infrared beam. Similarly, absorption information is derived based on the logarithm of a ratio between emission intensity and reception intensity of the infrared beam for gas detection. The gas concentration operating unit 50 provides gas concentration information based on a difference between the absorption information and the reference absorption information. The CRT 6 displays the gas concentration information as information relating to the gas leakage.

The infrared beam for detection and the infrared beam for reference may be emitted simultaneously from a single laser source including an organic pigment laser and a wavelength converting element. The wavelength converting element utilizes a non-linear effect to convert an emission wavelength of the laser to obtain a plurality of high-frequency waves. Two wavelengths selected from these high-frequency waves for use In this case, the two and-pas filters disposed on the optical path may be switched with predetermined timing.

(b) the gas leak discriminator 12 may determine presence or absence of gas leakage by referring to the detection information provided by the image sensor 4 and from intensity of the infrared beam having the wavelength to be absorbed by the detected gas "g". That is, the image sensor 4 provides absorption information for each detection point on a two-dimensional area corresponding to the gas leak monitoring territory A, and the gas leak discriminator 12 determines that gas leakage has occurred when the absorption information indicates that a certain area has a gas concentration exceeding a predetermined threshold level.

(c) The background of the gas leak monitoring territory may include, in addition to the spherical holder 2, the ground, a concrete wall, a painted steel structure and the like. A screen may be provided in a certain type of territory.

(d) In the case of a large monitoring territory a region irradiated by laser light may e shifted across the monitoring territory.

Although the laser emitter is used as the infrared emitting device in the foregoing embodiment, the light source is not limited to the laser emitter.

We claim:

1. A gas visualizing apparatus comprising:
   planar infrared detecting means for detecting infrared light radiated or reflected from a background of a gas leak monitoring territory;
   planar infrared emitting means for emitting a detection infrared beam in two-dimensional form toward said gas leak monitoring territory, said detection infrared beam having a wavelength absorbable by a gas to be detected;
   display means for displaying information relating to gas leakage as a two-dimensional visible image corresponding to said gas leak monitoring territory;
   said planar infrared emitting means including irradiated area varying means for converging or diverging said detection infrared beam to vary an area of said gas leakage monitoring territory;
   said planar infrared detecting means including transmission bandwidth varying means for setting a band of said infrared light incident to said planar infrared detecting means to a band which includes at least a portion of an absorption band substantially centering on the wavelength of said detection infrared beam where infrared light of this band is absorbed in said gas, said transmission bandwidth varying means also varying a width of said incident band so as to vary a ratio between an amount of information relating to said gas and an amount of information relating to said background within said incident band; and
   monitor mode switching means for switching between a passive mode in which only said planar infrared detecting means is operated to detect the infrared light radiated from the background of said gas leak monitoring territory detection information thereby obtained being displayed on said display means as the information relating to gas leakage, and an active mode in which both said planar infrared emitting means and said planar infrared detecting means are operated, detection information thereby obtained being displayed on said display means as the information relating to gas leakage.

2. A gas visualizing apparatus as claimed in claim 1, wherein said planar infrared emitting means provides such an output that, when said detection infrared beam is expanded to irradiate said gas leak monitoring territory, energy of said detection infrared beam reflected from said background at least corresponds to a sum of energy radiated from said background and energy of sunlight in daytime.

3. A gas visualizing apparatus as claimed in claim 1, further comprising gas leak discriminating means for determining occurrence of gas leakage based on the detection information provided by said planar infrared detecting means, said mode switching means being operable to select said passive monitor mode in a normal situation and to automatically switch to said active monitor mode when said gas leak discriminating means determines occurrence of gas leakage.

4. A gas visualizing apparatus as claimed in claim 3, wherein said transmission bandwidth varying means provides a narrower transmission band in said active monitor mode than in said passive monitor mode.

5. A gas visualizing apparatus as claimed in claim 4, wherein said incident band includes a wavelength of 3.39 um, and said width of said incident band is variable between 0.1 and 2 um.

6. A gas visualizing apparatus comprising:
   planar infrared detecting means for detecting infrared light radiated or reflected from a background of a gas leak monitoring territory;
   planar infrared emitting means for emitting a detection infrared beam in two-dimensional form toward said gas leak monitoring territory, said detection infrared beam having a wavelength absorbable by a gas to be detected;
   display means for displaying information relating to gas leakage as a two-dimensional visible image corresponding to said gas leak monitoring territory;
   said planar infrared emitting means including irradiated area varying means for converging or diverging said detection infrared beam to vary an area of said gas leak monitoring territory;
   said planar infrared detecting means including:
   transmission bandwidth varying means for setting a band of said infrared light incident to said planar infrared detecting means to a band which includes at least a portion of an absorption band substantially centering on the wavelength of said detection infrared beam where infrared light of this band is absorbed in said gas, said transmission bandwidth varying means also varying a width of said incident band so as to vary a ratio between an amount of information relating to said gas and an amount of information relating to said background within said incident band; and
   detection area varying means operable, upon detection of gas leakage within said gas leak monitoring territory, to zoom up a portion of said gas leak monitoring territory including a gas leaking area so as to allow said planar infrared emitting means to emit said detection infrared beam toward said portion of the gas leak monitoring territory;

gas leak discriminating means for discriminating an occurrence of gas leakage when a linear time-differentiated value or a quadratic time-differentiated value of a picture-element brightness signal of a common picture element of at least two images detected at different timings by said planar infrared detecting means exceeds a predetermined threshold value; and storage time controlling means for controlling an accumulation time period of said detection infrared beam within a range free from screen brightness saturation, so as to adjust sensitivity of said planar infrared detecting means.

7. A gas visualizing apparatus comprising:

planar infrared detecting means for detecting infrared light radiated or reflected from a background of a gas leak monitoring territory;

planar infrared emitting means including an He—Ne laser light source for emitting a detection infrared beam in two-dimensional form toward said gas leak monitoring territory, said detection infrared beam having a wavelength absorbable by a gas to be detected;

display means for displaying information relating to gas leakage as a two-dimensional visible image corresponding to said gas leak monitoring territory;

said planar infrared emitting means including irradiated area varying means for converging or diverging said detection infrared beam to vary an area of said gas leak monitoring territory;

said planar infrared detecting means including:

transmission bandwidth varying means for setting a band of said infrared light incident to said planar infrared detecting means to a band between 0.1 and 0.22 $\mu$m, said band includes at least a portion of an absorption band substantially centering on a wavelength of 3.39 $\mu$m of said detection infrared beam where infrared light of this band is absorbed in said gas, said transmission bandwidth varying means also varying a width of said incident band so as to vary a ratio between an amount of information relating to said gas and an amount of information relating to said background within said incident band, and detection area varying means operable, upon detection of gas leakage within said gas leak monitoring territory, to zoom up a portion of said gas leak monitoring territory including a gas leaking area so as to allow said planar infrared emitting means to emit said detection infrared beam toward said portion of said gas leak monitoring territory;

gas leak discriminating means for discriminating an occurrence of gas leakage when a linear time-differentiated value or a quadratic time-differentiated value of a picture element brightness signal of a common picture element of at least two images detected at different timings by said planar infrared detecting means exceeds a predetermined value; and storage time controlling means for controlling an accumulation time period of said detection infrared beam within a range free from screen brightness saturation, so as to adjust a sensitivity of said planar infrared detecting means.

8. A gas visualizing apparatus comprising:

planar infrared detecting means for detecting infrared light, in two-dimensional form, radiated or reflected from a background of a gas leak monitoring territory;

display means for displaying information from said planar infrared detecting means as a two-dimensional visible image corresponding to said gas leak monitoring territory;

transmission bandwidth varying means for setting a band of said infrared light incident to said planar infrared detecting means to a band which includes at least a portion of an absorption band where an infrared light of said band is absorbed in a gas to be detected, said transmission bandwidth varying means also varying a width of said incident band so as to vary a ratio between an amount of information relating to said gas and an amount of information relating to said background within said incident band;

gas leak discriminating means for determining an occurrence of gas leakage when a linear time-differentiated value or a quadratic time-differentiated value of a picture element brightness signal of a common picture element of at least two images detected at different timings by said planar infrared detecting means exceeds a predetermined threshold value; and storage time controlling means for controlling an accumulation time period of said detection infrared beam within a range free from screen brightness saturation, so as to adjust sensitivity of said planar infrared detecting means.

9. A gas visualizing apparatus comprising:

planar infrared detecting means for detecting infrared light, in two-dimensional form, radiated or reflected from a background of a gas leak monitoring territory;

display means for displaying information from said planar infrared detecting means as a two-dimensional visible image corresponding to said gas leak monitoring territory;

transmission bandwidth varying means for setting a band of said infrared light incident to said planar infrared detecting means to a band between 1 $\mu$m and 2 $\mu$m, said band includes at least a portion of an absorption band where infrared light of said band is absorbed in a gas to be detected, said transmission bandwidth varying means also varying a width of said incident band so as to vary a ratio between an amount of information relating to said gas and an amount of information relating to said background within said incident band;

gas leak discriminating means for determining occurrence of gas leakage when a linear time-differentiated value or quadratic time-differentiated value of a picture element brightness signal of a common picture element of at least two images detected at different timings by said planar infrared detecting means exceed a predetermined threshold value; and storage time controlling means for controlling an accumulation time period of the detection infrared beam within a range free from screen brightness saturation, so as to adjust a sensitivity of said planar infrared detecting means.

* * * * *